United States Patent Office 3,657,159
Patented Apr. 18, 1972

3,657,159
EPOXIDE POLYMERIZATION CATALYSTS COMPRISING COMPLEX ORGANOALUMINATE COMPOUNDS OF SILICON, TIN OR PHOSPHORUS
Edwin J. Vandenberg, Wilmington, Del., assignor to Hercules Incorporated, Wilmington, Del.
No Drawing. Continuation-in-part of abandoned application Ser. No. 767,476, Oct. 14, 1968. This application Aug. 27, 1970, Ser. No. 67,607
Int. Cl. C08g 23/14
U.S. Cl. 260—2 EP
12 Claims

ABSTRACT OF THE DISCLOSURE

Complex organoaluminate compounds of silicon, tin and phosphorus which are particularly useful as epoxide polymerization catalysts are described. These compounds can be prepared by reacting a lithium organoaluminate with a halogen-containing compound of silicon, tin or phosphorus, as for example by reacting lithium diethylaluminate with dimethyldichlorosilane, stannic chloride, dichlorophenylphosphine oxide, etc. or by reacting a trialkylaluminum such as triethylaluminum with dimethylsilanediol, methylphosphonic acid, stannic hydroxide, etc.

---

This application is a continuation-in-part of my application Ser. No. 767,476, filed Oct. 14, 1968, and now abandoned.

This invention relates to novel complex organoaluminates of silicon, tin and phosphorus and to their preparation and use as catalysts for the polymerization of epoxides. More particularly, the present invention relates to compounds of the formula

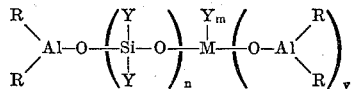

where R is an alkyl group, M is Si, P(O) or Sn; Y is an alkyl, alkoxy or aryl group; and (a) when M is Si, $n$ is 0 to 20, $m$ is 0 to 2, and $v$ is 1 to 3,
(b) when M is P(O), $n$ is 0, $m$ is 1, and $v$ is 1, and
(c) when M is Sn, $n$ is 0, $m$ is 0, and $v$ is 3 and to their preparation and use as catalysts for the polymerization of epoxides.

In the above formula each R can be the same or a different alkyl group and Y can be an alkyl, alkoxy or aryl group. Typical alkyl groups which R and Y can comprise include methyl, ethyl, propyl, isopropyl, n-butyl, isobutyl, amyl, hexyl, octyl, decyl, dodecyl, etc. Typical alkoxy groups which Y can comprise include methoxy, ethoxy, isopropoxy, butoxy, isobutoxy, t-butoxy, hexoxy, n-octoxy, iso-octoxy, etc. The preferred aryl groups which Y can comprise are phenyl or substituted phenyl groups such as tolyl, halophenyl, etc.

The compounds of this invention can be produced by reacting a lithium organoaluminate of the formula

with a halogen-containing compound of silicon, tin or phosphorus having the formula

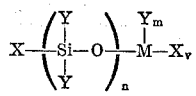

or by reacting a trialkylaluminum compound

with a hydroxyl-containing compound of silicon, tin or phosphorus having the formula

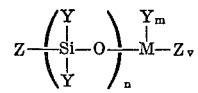

where R, Y, M, $m$, $n$ and $v$ are as stated above and X is halogen, i.e., chlorine, bromine, fluorine, or iodine and Z is hydroxyl.

The lithium organoaluminates which can be used to prepare the compounds of the invention are the lithium dialkyl aluminates such as for example lithium dimethylaluminate, lithium diethylaluminate, lithium diisobutylaluminate, lithium dihexylaluminate, lithium dioctylaluminate, etc.

Typical halogen-containing compounds of silicon, tin and phosphorus which can be reacted with the lithium organoaluminates to form the compounds of the invention include the dihalosilanes such as dimethyldichlorosilane, diethyldichlorosilane, diphenyldichlorosilane, etc.; the trihalosilanes such as methyltrichlorosilane, phenyltrichlorosilane, isopropoxytrichlorosilane, etc.; the tetrahalosilanes such as silicon tetrachloride; 1,3-dichloro-1,1,3,3-tetramethyldisiloxane, 1,5 - dichloro-1,1,3,3,5,5-hexamethyltrisiloxane, 1,7 - dichloro-1,1,3,3,5,5,7,7,-octamethyltetrasiloxane, etc.; stannic chloride; dichloromethylphosphine oxide, dichloromethoxyphosphine oxide, dichlorophenylphosphine oxide, etc.; and the corresponding bromine, iodine, or fluorine derivatives of any of the above.

The trialkylaluminum compounds which can be reacted with a polyhydroxy-containing compound of silicon, tin or phosphorus to produce the compounds of this invention are suitably triethylaluminum, triisobutylaluminum, trihexylaluminum, trioctylaluminum, etc.

Typical hydroxyl-containing compounds of silicon, tin and phosphorus which can be reacted with the trialkylaluminum compound include the dihydroxysilanes such as dimethylsilanediol, diethylsilanediol, dioctylsilanediol, diphenylsilanediol, dimethoxysilanediol, etc.; the trihydroxy silanes such as methylsilanetriol; 1,1,3,3-tetramethyl-1,3-disiloxanediol, 1,1,3,3,5,5 - hexamethyl-1,5-trisiloxanediol, 1,1,3,3,5,5,7,7 - octamethyl - 1,7 - tetrasiloxanediol, etc.; stannic hydroxide; phenylphosphonic acid, methylphosphonic acid, ethylphosphonic acid, etc.

The reaction of the lithium organoaluminate or the trialkylaluminum and the appropriate silicon, tin or phosphorus compound takes place readily at from about 0° C. to about 250° C. and preferably at about 30° C. to about 200° C., and can be carried out in any desired manner. The reaction requires at least a stoichiometric amount of the aluminum compound for each halogen or hydroxyl substituent present in the silicon, tin or phosphorus compound and an excess of the aluminum compound is usually preferred. Preferably, the reaction is conducted in the presence of a diluent which suitably is also a solvent for the reaction product. Typical diluents which can be used include hydrocarbons such as toluene, benzene, xylene, tert-butyl benzene, n-heptane, n-hexane, n-octane, iso-octane, cyclohexane methylcyclohexane dimethylcyclohexane, naphthalene, tetrahydronaphthalene, etc., ethers such as diethyl ether, dibutyl ether, tetrahydrofuran, dioxane, and the like.

The lithium organoaluminate used in the synthesis of the compounds of this invention can be prepared in known manner, as by heating the desired triorganoaluminum compound with lithium hydroxide, using, for example, the methods of Tani et al., J. Polymer Sci., B, 97 (1966) and J. Am. Chem. Soc., 89, 173 (1967).

The complex organoaluminates of this invention can be used as such for the polymerization of epoxides, or, if desired, can be further reacted partially with water, alcohols, coordinating solvents, amines or a chelating agent and then used for the polymerization of epoxides. Typical coordinating solvents are ethers such as tetrahydrofuran and typical amines include triethylamine, pyridine, etc. Any chelating agent which is capable of forming a ring by coordination with the aluminum atom can be used. Preferably, the chelating agents are characterized by two functional groups, one of which is an —OH groups or —SH group, as for example, a hydroxy, or an enol of a ketone, sulfoxide or sulfone, an OH of a carboxyl group, etc., which —OH or —SH group interacts with the organoaluminum component to form a conventional, covalent aluminum-oxygen bond or aluminum-sulfur bond. The second functional group is one which contains an oxygen, nitrogen, or sulfur atom that forms a coordinate bond with the aluminum. Examples of groups containing such oxygen, nitrogen or sulfur atoms are:

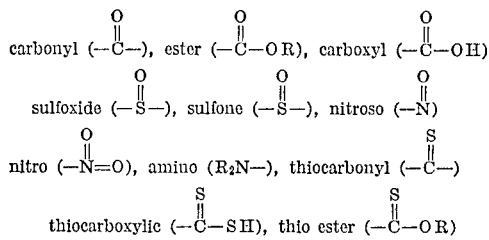

etc., groups. The ring size formed with the aluminum by the chelating agent preferably contains five or six atoms including the aluminum, but rings with four and seven atoms are also operable.

Typical chelating agents which can be reacted with the complex organoaluminate compounds of this invention are diketones, such as acetylacetone, trifluoroacetylacetone, acetonylacetone, benzoylacetone, furoylacetone, thenoyltrifluoroacetone, dibenzoyl methane, 3 - methyl-2,4 - pentane - dione, 3 - benzyl - 2,4 - pentane - dione, etc.; ketoacids, such as acetoacetic acid; ketoesters such as ethyl acetoacetate; ketoaldehydes such as formylacetone; hydroxyketones such as hydroxyethyl methyl ketone, hydroxyacetone, o-hydroxyacetophenone, 2,5 - dihydroxy-p-benzoquinone, etc.; hydroxyaldehydes such as salicylaldehyde; hydroxy esters such as ethyl glycolate, 2-hydroxyethyl acetate, etc.; dicarboxylic acids and their esters such as oxalic acid, malonic acid, etc., monoesters of oxalic acid, mono- and diesters of malonic acid, etc.; dialdehydes such as malonaldehyde; alkoxyacids such as ethoxyacetic acid; ketoximes such as 2,3 - butane-dione-monoxime; dialdehyde monooximes such as glyoxal monoxime; hydroxamic acids such as N-phenyl benzohydroxamic acid; dioximes such as dimethyl glyoxime; nitro compounds such as 1,3 - nitroalcohols, 1,3 - nitroketones, 2 - nitroacetic acid, etc.; nitroso compounds such as 1,2-nitroso-oximes; etc. Chelating agents with two or more chelating functions may also be used, as for example, 2,5 - dihydroxy - p - benzoquinone; bis(1,3 - diketones) such as $(CH_3CO)_2CHCH(COCH_3)_2$;

$(CH_3CO)_2CH(CH_2)_nCH(COCH_3)_2$ where $n$ is 2, 6, or 10; bis(1,2 - ketoximes); bis(1,2-dioximes); etc. The amount of water, alcohol, coordinating solvent or chelating agent reacted with the aluminates of this invention will generally be within the range of from about 0.01 to about 1 mole per mole of aluminum, and preferably from about 0.1 to about 0.8 mole per mole of aluminum, but must be such that at least 0.2 and preferably 0.5 hydrocarbon to aluminum bonds remain.

The following examples illustrate the preparation of the complex organoaluminates of the invention. All parts and percentages are by weight unless otherwise indicated.

The lithium diethylaluminate used in Examples 1 to 6 was prepared by adding a molecular equivalent of triethylaluminum portion-wise as a 1.9 molar solution in toluene to a rapidly agitated 0.68 molar dispersion of lithium hydroxide in toluene in a reaction vessel maintained at 0° C. under a nitrogen atmosphere. Agitation was continued and the reaction mixture was permitted to warm to room temperature, after which time the reaction mixture was heated to 57° C. to 58° C. and maintained at this temperature with agitation for 16 hours, and then cooled. Analysis of the solution indicated that lithium diethylaluminate was formed, the aluminate having two ethyl groups per aluminum atom and was present at a 0.46 molar concentration (aluminum basis).

The lithium diisobutylaluminate used in Example 7 was prepared by adding a molecular equivalent of triisobutylaluminum portion-wise as a 1.9 molar solution in toluene to a rapidly agitated 0.68 molar dispersion of lithium hydroxide in toluene in a reaction vessel maintained at 0° C. under a nitrogen atmosphere. Agitation was continued and the reaction mixture was permitted to warm to room temperature, after which time the reaction mixture was heated to 65° C. and maintained at this temperature with agitation for 32 hours, and then cooled. Analysis of the solution indicated that diisobutylaluminate was formed, the aluminate having two isobutyl groups per aluminum atom and being present at a 0.47 molar concentration (aluminum basis).

EXAMPLES 1 TO 6

In these examples, various complex aluminates were produced by reacting the 0.5 molar lithium diethylaluminate ($Et_2AlOLi$) in toluene prepared as described above, with an appropriate chloride. The reaction was carried out by injecting the chloride into a reaction vessel equipped with a magnetic stirrer and containing the solution of the lithium diethyl aluminate in toluene and then agitating the vessel contents at 25° C. overnight, after which time precipitated LiCl was removed by centrifuging and the solution containing the complex organoaluminate product of this invention was recovered. The chloride used and the millimoles of each reactant are tabulated below in Table I along with the ethyl to aluminum molar ratio (Et:Al) in the product, as determined by analysis. A portion of the product solution of Example 1 was also stripped of solvent at room temperature and reduced pressure. Analysis for carbon, hydrogen, silicon and aluminum, showed the product to have the formula $(CH_3)_2Si[OAl(C_2H_5)_3]_2$.

TABLE I

| Example No. | Reaction medium | | | Product | |
|---|---|---|---|---|---|
| | Chloride compound | Millimoles | Millimoles Et$_2$AlOLi | Toluene, parts | Compound | Et:Al found |
| 1 | $(CH_3)_2SiCl_2$ | 9.2 | 18.4 | 35 | $(CH_3)_2Si(OAlEt_2)_2$ | 2.0 |
| 2 | $(CH_3)_2SiCl_2$ | 20.9 | 41 | 23 | $(CH_3)_2Si(OAlEt_2)_2$ | 1.8 |
| 3 | $(C_6H_5)_2SiCl_2$ | 13.3 | 26.6 | 23 | $(C_6H_5)_2Si(OAlEt_2)_2$ | 1.7 |
| 4 | $SnCl_4$ | 6.2 | 24.9 | 23 | $Sn(OAlEt_2)_4$ | 2.3 |
| 5 | $Cl_2P(O)OCH_3$ | 12.9 | 25.9 | 23 | $(Et_2AlO)_2P(O)OCH_3$ | 1.9 |
| 6 | $Cl_2P(O)C_6H_5$ | 12.2 | 24.3 | 23 | $(Et_2AlO)_2P(O)C_6H_5$ | 2.2 |

EXAMPLE 7

The procedure of Example 1 was repeated except that 18.4 millimoles of 0.47 molar lithium diisobutylaluminate in toluene (prepared as described above) was substituted for the 18.4 millimoles of 0.5 molar lithium diethylaluminate and 4.6 millimoles of silicon tetrachloride was substituted for the 9.2 millimoles of dimethyldichlorosilane. Analysis for carbon, hydrogen, silicon and aluminum showed the product to have the formula $$Si[OAl(C_4H_9)_2]_4$$

and to have an isobutyl:aluminum ratio of 1.9.

EXAMPLES 8–11

In these examples various complex aluminates were prepared according to the procedure of Examples 1 to 6 using various chlorides as reactants. The chloride used and the millimoles of each reactant are tabulated below in Table II along with the ethyl to aluminum ratio (Et:Al) in the product, as determined by analysis.

TABLE II

| Example No. | Reaction medium | | | | Product | |
|---|---|---|---|---|---|---|
| | Chloride compound | Millimoles | Millimoles Et₂AlOLi | Toluene, parts | Compound | Et:Al found |
| 8 | (CH₃O)₂SiCl₂ | 9.2 | 18.4 | 35 | (CH₃O)₂Si(OAlEt₂)₂ | 2.0 |
| 9 | Cl—(Si(CH₃)₂—O)₂—SiCl₂ | 9.2 | 18.4 | 35 | Et₂AlO—(Si(CH₃)₂—O)₂—Si(OAlEt₂)₂ | 1.9 |
| 10 | Cl—(Si(CH₃)₂—O)₂—SiCl₃ | 9.2 | 18.4 | 35 | Et₂AlO—(Si(CH₃)₂—O)₂—Si(OAlEt₂)₃ | 2.0 |
| 11 | Cl₂P(O)CH₃ | 12.9 | 25.9 | 23 | (Et₂AlO)₂P(O)CH₃ | 2.1 |

EXAMPLE 12

To a nitrogen filled vessel equipped with an agitator and containing 23 parts of a 1.9 molar solution of triethylaluminum in toluene (equivalent to 5.7 parts of triethylaluminum) and 43 parts of dry tetrahydrofuran cooled to 0° C. was added, with agitation over a period of 15 minutes 24.3 parts of a commercial hydroxylended dimethylsiloxane of the formula

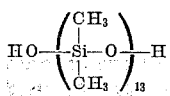

and having a number average molecular weight of 970 and a hydroxyl analysis of 3.5%, the mixture gelling toward the end of the addition. While continuing agitation, the temperature of the mixture was raised to 30° C., and maintained there for 30 minutes, after which time 22 parts of dry tetrahydrofuran was added and the mixture agitated for an additional 19 hours at 30° C. The resulting solution was found to be a 0.4 molar solution of

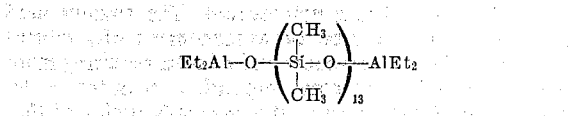

and analyzed 0.41 molar with respect to aluminum and 0.83 molar with respect to ethyl groups. This solution was designated as catalyst A.

One half of the above solution (catalyst A) was transferred to a nitrogen filled vessel equipped with an agitator and the solution cooled to 0° C. Then 2.5 parts of acetylacetone was added to the vessel using agitation over a 15 minute period and the vessel contents were agitated while maintaining the temperature at 0° C. for an additional 15 minutes, after which time cooling was discontinued and agitation was continued overnight. The resulting solution, designated as catalyst B, was a 0.4 molar solution of

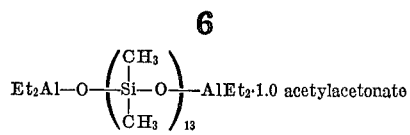

and analyzed 0.38 molar with respect to aluminum and 0.72 molar with respect to ethyl groups.

As stated above, the compounds of this invention are useful as polymerization catalysts for epoxides. Any epoxide-containing monomer having an epoxy group which is an oxirane or oxetane ring, i.e., oxiranes or oxetanes, can be homopolymerized or copolymerized with a second epoxide using the compounds of this invention. Exemplary of the oxiranes that can be homopolymerized or copolymerized are the alkylene oxides such as ethylene oxide, 1,2-propylene oxide, butene oxides (butene-1 oxide and the cis- and trans-butene-2-oxides), isobutylene epoxide; substituted alkylene oxides such as epichlorohydrin, epibromohydrin, epifluorohydrin, methallyl chloride, epoxide, trifluoromethylethylene oxide, perfluoropropylene oxide, perfluoroethylene oxide, vinyl chloride epoxide, dichloroisobutylene epoxide, 1,2 - dichloro - 3,4-epoxybutane, 1-chloro - 3,4 - epoxybutane, 1 - chloro - 4,5-epoxypentane, 1,1 - dichloro - 2,3 - epoxypropane, 1,1,1 - trichloro-2,3-epoxypropane, 1,1,1 - trichloro - 3,4 - epoxybutane, etc.; cycloaliphatic epoxides such as cyclohexene oxides, vinyl cyclohexene oxides (mono- and dioxides), α-pinene epoxide, dipentene epoxide, etc.; epoxy ethers such as alkyl glycidyl ethers as, for example, methyl glycidyl ether, ethyl glycidyl ether, isopropyl glycidyl ether, isobutyl glycidyl ether, tert-butyl glycidyl ether, n-hexyl glycidyl ether, n-octyl glycidyl ether, etc.; phenyl glycidyl ether, chlorophenyl glycidyl ethers, nitrophenyl glycidyl ethers, alkylphenyl glycidyl ethers, chloroalkyl glycidyl ethers, such as chloroethyl glycidyl ether, bromoethyl glycidyl ether, 2-chloro-1-methyl ethyl glycidyl ether; unsaturated glycidyl ethers such as vinyl glycidyl ether, allyl glycidyl ether, α-allylphenyl glycidyl ether, etc.; glycidyl esters such as glycidyl acetate, glycidyl propionate, glycidyl pivalate, glycidyl methacrylate, glycidyl acrylate, glycidyl oleate, glycidyl resinate, etc.; alkyl glycidates such as methyl glycidate, ethyl glycidate, etc.; and other epoxides as, for example, styrene oxide, α-methylstyrene oxide, butadiene mono- and dioxides, epoxy stearates, 1 - dimethylamino-2,3-epoxypropane, trimethyl 2,3-epoxypropyl ammonium chloride, etc. Particularly useful are ethyl oxide and its monosubstitued derivatives such as propylene oxide, ephalohydrins, etc.

The oxetanes that can be homopolymerized or copolymerized using the compounds of this invention are characterized by the structural formula

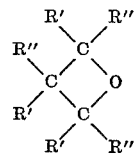

wherein each R' and each R" substituent is any group other than those which react with the catalyst, such as free hydroxyl, primary amino, or secondary amino groups.

By way of example, suitable R' and R" substituents include such substituents as hydrogen; halogens including fluoro, chloro, bromo, and iodo substituent groups; alkyl, cycloalkyl, aryl, and aralkyl groups such as methyl, ethyl, propyl, butyl, cyclohexyl, phenyl, tolyl, benzyl, and the like; nitroalkyl such as nitromethyl, nitroethyl, and the like; nitratoalkyl such as nitratomethyl, nitratoethyl, and the like; cyanoalkyl such as cyanomethyl, cyanoethyl, and the like; alkoxy, aryloxy, aralkoxy, etc., such as methoxy, ethoxy, phenoxy, and the like; alkyl-, cycloalkyl-, aryl-, and aralkyloxymethyl groups such as methoxymethyl, ethoxymethyl, phenoxymethyl, benzyloxymethyl, and the like; acyloxyalkyl groups such as acetoxymethyl, acetoxyethyl, benzoxymethyl, and the like; haloalkyl groups such as chloromethyl, bromoethyl, iodomethyl, fluoromethyl, chloroethyl, chloropropyl, and the like; tertiary aminoalkyl groups such as dimethylaminomethyl, dimethylaminoethyl, and the like; acylamidoalkyl groups such as acetamidomethyl, sulfonamidomethyl, and the like; ethylenically unsaturated aliphatic radicals such as vinyl, propenyl, isopropenyl, allyl, methallyl, butenyl, allyloxymethyl, propenyloxymethyl, methallyloxymethyl, oleyl, and the like; and cycloalkyl or aryl radicals containing an ethylenically unsaturated substituent and cycloalkyl radicals containing an ethylenic double bond in the ring, as, for example, 4-vinylcyclohexyl, α-terpinyl, γ-terpinyl, abietyl, cyclohexenylmethyl, o-allylphenyl, p-vinylbenzyl, and the like. Illustrative of typical oxetanes includes oxetane, 2-bromo oxetane, 2-methyl oxetane, 2-cyclohexyl oxetane, 2 - benzyl oxetane, 2-nitropropyl oxetane, 2-cyanoethyl oxetane, 2-methoxy oxetane, 2-phenoxy oxetane, 2-methoxyethyl oxetane, 2 - benzyloxymethyl oxetane, 2 - allyl oxetane, 2 - vinylbenzyl oxetane, 2-chloromethyl oxetane, and the like;

2,2-bis(chloromethyl) oxetane,
2,2-bis(2-chloroethyl) oxetane,
2,2-dimethyl oxetane,
2-chloro-2-methyl oxetane,
2-fluoro-2-bromomethyl oxetane,
2,2-bis(nitratomethyl) oxetane,
2-methoxy-2-methyl oxetane,
2-carbomethoxy-2-chloromethyl oxetane,
2-methallyl-2-methyl oxetane,
and the like;

2-vinyl-3,3-bis(chloromethyl) oxetane,
2-methoxy-3,3-bis(bromomethyl) oxetane,
2-vinylbenzyl-3,3-dimethyl oxetane,
2-allyloxymethyl-3-chloromethyl-3-ethyl oxetane,
2-phenoxymethyl-3-fluoro-3-methyl oxetane,
and the like;

2-methyl-3,3-bis(chloromethyl)-4-methyl oxetane,
2-vinyl-3,3-bis(iodomethyl)-4-methoxy oxetane,
2-chloromethyl-3,3-dimethyl-4-chloromethyl oxetane,
2-chloro-3-ethyl-3-methoxymethyl-4-(o-allylphenyl) oxetane,
2-ethyl-3,3-bis(phenoxymethyl)-4-allyl oxetane,
and the like;

2-methyl-3-methyl oxetane,
2-chloromethyl-3-bromo oxetane,
2-methoxy-3-butenyl oxetane,
2-methallyloxymethyl-3-ethyl oxetane,
2-propenyl-3-bromoethyl oxetane,
2-methoxymethyl-3-propyl oxetane,
and the like;

3-chloro oxetane,
3-ethyl oxetane,
3-cyclohexyl oxetane,
3-phenyl oxetane,
3-methoxy oxetane,
3-allyl oxetane,
3-chloromethyl oxetane,
3-vinyl oxetane,
and the like;

3,3-bis(chloromethyl) oxetane,
3,3-bis(bromomethyl) oxetane,
3,3-bis(iodomethyl) oxetane,
3,3-bis(fluoromethyl) oxetane,
3,3-bis(2-chloroethyl) oxetane,
3-bromomethyl-3-chloromethyl oxetane,
3,3-dimethyl oxetane,
3,3-diethyl oxetane,
3,3-bis(chloro) oxetane,
3,3-bis(bromo) oxetane,
3-chloro-3-chloromethyl oxetane,
3-bromo-3-ethyl oxetane,
3-fluoro-3-bromomethyl oxetane,
3-fluoro-3-chloro oxetane,
3-ethyl-3-methyl oxetane,
3-chloromethyl-3-ethyl oxetane,
3-chloromethyl-3-methyl oxetane,
3,3-bis(cyanomethyl) oxetane,
3,3-bis(nitratomethyl) oxetane,
3-chloromethyl-3-nitromethyl oxetane,
3-methoxy-3-methyl oxetane,
3-ethyl-3-methoxymethyl oxetane,
3-ethoxymethyl-3-methyl oxetane,
3-carbomethoxy-3-chloromethyl oxetane,
3,3-bis(phenoxymethyl) oxetane,
3-vinyl-3-methyl oxetane,
3-allyl-3-chloromethyl oxetane,
3-isopropenyl-3-ethyl oxetane,
3-chloromethyl-3-(4-vinylcyclohexyl) oxetane,
3-methyl-3-methallyl oxetane,
3,3-bis(allyl) oxetane,
and the like;

2-methyl-3-methyl-4-methyl oxetane,
2-ethyl-3-chloromethyl-4-ethyl oxetane,
2-chloromethyl-3-vinyl-4-chloromethyl oxetane,
2-methoxy-3-bromo-4-methyl oxetane,
2-allyl-3-methoxy-4-carbomethoxy oxetane,
and the like;

2-methyl-4-methyl oxetane,
2-vinyl-4-chloroethyl oxetane,
2-chloro-4-allyl oxetane,
2-methoxy-4-ethyl oxetane,
2-chloromethyl-4-chloromethyl oxetane,
2-chloromethyl-4-cyanomethyl oxetane,
and the like.

Moreover, mixtures of two or more of any of the above oxiranes or oxetanes can be used whenever it is desired, as, for example, to modify the properties of the end product.

Any amount of the complex organoaluminates of the present invention can be used to catalyze the polymerization of epoxides from a minor catalytic amount up to a large excess but, in general, will be within the range of from about 0.2 to about 10 mole percent based on the monomer being polymerized and preferably will be within the range of from about 1 to about 5 mole percent based on the monomer being polymerized. The amount used depends in part on such factors as monomer purity, diluent purity, etc., less pure epoxides and diluents requiring more catalyst to destroy reactive impurities. In order to decrease catalyst consumption, it is generally preferred that impurities such as carbon dioxide, oxygen, aldehydes, alcohols, etc., be kept at as low a level as practical.

The polymerization reaction can be carried out by any desired means, either as a batch or continuous process with the catalyst added all at one time or in increments during the polymerization or continuously throughout the polymerization. If desired the monomer can be added gradually to the polymerization system. It can be carried out as a bulk polymerization process, in some cases at the boiling point of the monomer (reduced to a convenient level by adjusting the pressure) so as to remove the heat of reaction. However, for ease of operation, it is more generally carried out in the presence of an inert diluent. Any diluent that is inert under the polymerization reaction conditions can be used as, for example, ethers such as the dialkyl, aryl, or cycloalkyl ethers as, for example, diethyl ether, dipropyl ether, diisopropyl ether, aromatic hydrocarbons such as benzene, toluene, etc., or saturated aliphatic hydrocarbons and cycloaliphatic hydrocarbons such as n-heptane, cyclohexane, etc., and halogenated hydrocarbons, as for example, chlorobenzene or haloalkanes such as methyl chloride, methylene chloride, chloroform, carbon tetrachloride, ethylene dichloride, etc. Obviously, any mixture of such diluents can be used and in many cases is preferable. For example, when saturated aliphatic hydrocarbons are used as the diluent, it is preferable, particularly if high molecular weight polymers are desired or if very little diluent is present, to use them in admixture with ethers.

The polymerization process in accordance with this invention can be carried out over a wide temperature range and pressure. Usually, it will be carried out at a temperature from about $-80°$ C. up to about $250°$ C., preferably from about $-80°$ C. to about $150°$ C. and more preferably within the range of about $-30°$ C. to about $100°$ C.

(ethylene oxide) was determined in chloroform at $25°$ C., unless otherwise indicated.

EXAMPLES 13 TO 22

A series of runs was conducted in which ethylene oxide was polymerized with the catalysts of Examples 1 to 5 and 7 to 11. In each run, a polymerization vessel was charged under nitrogen with heptane as diluent, and 10 parts of ethylene oxide. After equilibrating at $30°$ C., catalyst solution was injected into each reaction mixture, and the mixture agitated at $30°$ C. for 20 to 24 hours. The polymerization was stopped by adding 4 parts of anhydrous ethanol and each mixture was then diluted with 5 volumes of diethyl ether, after which the ether-insoluble polymer was filtered and washed twice with ether, then with 0.5% hydrogen chloride in an 80:20 mixture of ether:ethanol, with 80:20 ether:ethanol alone and then with ether containing 0.4% of 4,4'-thiobis(6-tert-butyl-m-cresol). Each polymer was finally dried for 16 hours at $50°$ C. under vacuum. In Table III, are set forth details of the polymerizations and the poly(ethylene oxide) so produced.

TABLE III

| Example No. | Amount of heptane (parts) | Catalyst Formula | Ex. No. | Milli-moles | Ethyl: aluminum molar ratio | RSV | Degree of cryst. | Appearance |
|---|---|---|---|---|---|---|---|---|
| 13 | 64 | $(CH_3)_2Si(OAlEt_2)_2$ | 1 | a 4 0 | 2 0 | 1 7 | High | Tough solid. |
| 14 | 63 | $(CH_3)_2Si(OAlEt_2)_2$ | 2 | 2 0 | 1 1 | 2 2 | do | Do. |
| 15 | 63 | $(C_6H_5)_2Si(OAlEt_2)_2$ | 3 | 2 0 | 1 7 | | do | Powder. |
| 16 | 60 | $Sn(OAlEt_2)_4$ | 4 | a 4 0 | 2 3 | 1.2 | Low | Tough solid. |
| 17 | 60 | $(Et_2AlO)_2P(O)OCH_3$ | 5 | a 4.0 | 1.9 | | High | Do. |
| 18 | 64 | $Si[OAl(isoC_4H_9)_2]_4$ | 7 | a 4.0 | b 1.9 | 1.6 | do | Do. |
| 19 | 64 | $(CH_3O)_2Si(OAlEt_2)_2$ | 8 | a 4.0 | 2.0 | 1.8 | do | Do. |
| 20 | 64 | $Et_2AlO\text{---}(Si(CH_3)(CH_3)\text{---}O)_2\text{---}Si(CH_3)(OAlEt_2)_2$ | 9 | a 4.0 | 1.9 | 2 2 | do | Do. |
| 21 | 64 | $Et_2AlO\text{---}(Si(CH_3)O)_2\text{---}Si(OAlEt_2)_3$ | 10 | a 4.0 | 2.0 | 1.9 | do | Do. |
| 22 | 60 | $(Et_2AlO)_2P(O)CH_3$ | 11 | a 4.0 | 2.1 | 1.8 | do | Do. | a One-half added in the beginning, and the remainder after 18.5 hours of polymerization time.
b Isobutyl:aluminum ratio.

Usually, the polymerization process will be carried out at autogeneous pressure, but superatmospheric pressures up to several hundred pounds can be used if desired and in the same way, subatmospheric pressures can also be used.

The following examples illustrate the polymerization of epoxides using the catalysts prepared in the above examples. All parts and percentages are by weight unless otherwise indicated. The molecular weights of the polymers are indicated by the reduced specific viscosity (RSV). By the term "reduced specific viscosity" is meant the specific viscosity measured on a solution containing 0.1 gram of the polymer in 100 ml. of solution divided by the concentration (0.1%) of the solution. The RSV of poly(epichlorohydrin) and the copolymer of epichlorohydrin and ethylene oxide was determined in α-chloronaphthalene containing 3% acetylacetone at $100°$ C., and the RSV of poly-

EXAMPLES 23 TO 27

The procedure of Examples 13 to 22 was repeated except that the monomer charge was 10 parts of a 90-10 mixture of epichlorohydrin and ethylene oxide, the diluent was toluene, the catalysts were the compounds of Examples 1 to 3, 5 and 6 and the copolymer was isolated by adding 1 to 5 volumes of n-heptane to precipitate the copolymer, filtering and then washing with n-heptane and a 0.2% solution of 4,4'-thiobis(6-tert-butyl-m-cresol) in n-heptane and finally drying for 16 hours at $80°$ C. in vacuo. Details of these examples are set forth in Table IV.

TABLE IV

| Example No. | Amount of toluene (parts) | Catalyst Formula | Ex. No. | Milli-moles | Ethyl: aluminum molar ratio | RSV | Degree of cryst. | Appearance |
|---|---|---|---|---|---|---|---|---|
| 23 | 73 | $(CH_3)_2Si(OAlEt_2)_2$ | 2 | 2.0 | 1.1 | 0.31 | Amorphous | Soft powder. |
| 24 | 73 | $(C_6H_5)_2Si(OAlEt_2)_2$ | 3 | 2.0 | 1.7 | 0.79 | Low | Rubber. |
| 25 | 70 | $(Et_2AlO)_2P(O)OCH_3$ | 5 | a 4.0 | 1.9 | 0.29 | None | Tacky rubber. |
| 26 | 70 | $(Et_2AlO)_2P(O)C_6H_5$ | 6 | a 4.0 | 2.2 | 0.22 | Low | Rubber. |
| 27 | 81 | $(CH_3)_2Si(OAlEt_2)_2$ | 1 | a 4.0 | 2.0 | | Trace | Do. | a One-half added in the beginning, and the remainder after 18.5 hours of polymerization time.

EXAMPLES 28 TO 30

The procedure of Examples 23 to 27 was repeated except that 10 parts of epichlorohydrin was substituted for the epichlorohydrin-ethylene oxide mixture, and the diluent was 71 parts of toluene. Details of these examples are recorded below in Table V.

TABLE V

| Example No. | Catalyst Formula | Ex. No. | Milli-moles | Ethyl: aluminum molar ratio | Isolated polymer RSV | Degree of cryst. | Appearance |
|---|---|---|---|---|---|---|---|
| 28 | Sn(OAlEt$_2$)$_4$ | 4 | a 4.0 | 2.3 | 1.75 | Moderate | Waxy solid. |
| 29 | (Et$_2$AlO)$_2$P(O)OCH$_3$ | 5 | a 4.0 | 1.9 | 0.06 | None | Rubber. |
| 30 | (Et$_2$AlO)$_2$P(O)C$_6$H$_5$ | 6 | a 4.0 | 2.2 | 0.13 | Low | Do. | a One-half added in the beginning, and the remainder after 18.5 hours of polymerization time.

EXAMPLES 31 TO 32

In these examples each of two polymerization vessels was charged under nitrogen with 29 parts of n-heptane diluent and 5 parts of ethylene oxide. After equilibrating at 30° C., 1 millimole of the catalyst solution A of Example 12 or the catalyst solution B of Example 12 was injected into each reaction mixture and the mixture agitated for 26 hours at 30° C., after which time an additional 1 millimole of the same catalyst solution was added to each vessel and agitation was continued at 30° C. for a total polymerization time of 93 hours. The polymerization reactions were stopped with ethanol and the polymers isolated, washed and dried according to the procedure of Examples 13 to 22. Poly(ethylene oxide) in 33% conversion (based on total solids) was obtained using catalyst solution A, the isolated polymer being a hard white polymer of RSV 1.8. Poly(ethylene oxide) in 14% conversion (based on total solids) was obtained with catalyst solution B, the isolated polymer being a hard white polymer of RSV 6.6.

What I claim and desire to protect by Letters Patent is:

1. The process of preparing polyepoxides which comprises polymerizing epoxides, wherein the epoxy group is an oxirane or oxetane ring, by contacting at least one of said epoxides with, as the catalyst, a composition comprising a compound of the formula

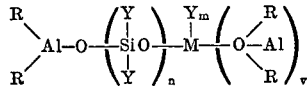

where R is an alkyl group; Y is selected from the group consisting of alkyl, alkoxy and aryl groups; M is selected from the group consisting of Si, P(O) and Sn; and
  (a) when M is Si, $n$ is 0 to 20, $m$ is 0 to 2, $v$ is 1 to 3,
  (b) when M is P(O), $n$ is 0, $m$ is 1, and $v$ is 1, and
  (c) when M is Sn, $n$ is 0, $m$ is 0, and $v$ is 3.
2. The process of claim 1 wherein M is Si.
3. The process of claim 2 wherein $n$ is 0, $m$ is 2, and $v$ is 1.
4. The process of claim 3 wherein each R is ethyl and Y is methyl.
5. The process of claim 3 wherein each R is ethyl and Y is phenyl.
6. The process of claim 2 wherein $n$ is 1 to 20, $m$ is 2, and $v$ is 1.
7. The process of claim 6 wherein each R is ethyl, Y is methyl and $n$ is 12.
8. The process of claim 1 wherein the compound has the formula

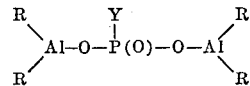

where R and Y are as indicated in claim 1.
9. The process of claim 8 wherein each R is ethyl and Y is phenyl.
10. The process of claim 8 wherein each R is ethyl and Y is methoxy.
11. The process of claim 1 wherein the compound has the formula

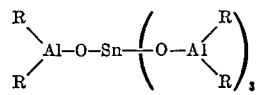

where R is as indicated in claim 1.
12. The process of claim 11 wherein each R is ethyl.

References Cited
UNITED STATES PATENTS 3,219,591  11/1965  Vandenberg _____ 252—431
3,341,475   9/1967  Vandenberg _____ 260—2
3,463,743   8/1969  Durst et al. _____ 252—431

HAROLD D. ANDERSON, Primary Examiner

U.S. Cl. X.R.

252—431 R, 431 P; 260—2 A, 2 XA, 47 EP, 88.3 A, 429.7, 448 A, 613 B, 615 B